United States Patent [19]
Watanabe

[11] Patent Number: 5,469,735
[45] Date of Patent: Nov. 28, 1995

[54] SELF-DIAGNOSING APPARATUS AND METHOD FOR DETERMINING OCCURENCE OF FAILURE IN INNER CYLINDER PRESSURE RESPONSIVE SENSOR APPLICABLE TO ENGINE COMBUSTION DETECTING/CONTROLLING SYSTEM

[75] Inventor: Satoru Watanabe, Atsugi, Japan

[73] Assignee: Unisia Jecs Corporation, Atsugi, Japan

[21] Appl. No.: 352,280

[22] Filed: Dec. 9, 1994

[30] Foreign Application Priority Data

Dec. 9, 1993 [JP] Japan .................. 5-309412

[51] Int. Cl.⁶ ................................. G01M 19/00
[52] U.S. Cl. ................ 73/118.1; 73/4 R; 73/117.3
[58] Field of Search .............. 73/4 R, 115, 116, 73/117.2, 117.3, 120

[56] References Cited

U.S. PATENT DOCUMENTS

| | | | |
|---|---|---|---|
| 4,531,399 | 7/1985 | Aono | 73/4 R |
| 4,537,065 | 8/1985 | Ootsuka et al. | 73/117.3 |
| 4,660,535 | 4/1987 | Asano | 123/425 |
| 4,744,244 | 5/1988 | Tanaka | 73/4 R |
| 4,781,059 | 11/1988 | Suzuki et al. | 73/115 |
| 5,386,723 | 2/1995 | Wier | 73/117.3 |

FOREIGN PATENT DOCUMENTS

| | | |
|---|---|---|
| 62-26345 | 2/1987 | Japan . |
| 63-17432 | 2/1988 | Japan . |
| 4-81557 | 3/1992 | Japan . |

*Primary Examiner*—Richard Chilcot
*Assistant Examiner*—Eric S. McCall
*Attorney, Agent, or Firm*—Foley & Lardner

[57] ABSTRACT

In a self-diagnose apparatus and method for detecting an occurrence of failure in any one of a plurality of inner pressure responsive sensors due to a variety mode of failures, an integral value $IMEP_i$ within a predetermined integral interval of an inner cylinder pressure P for each engine cylinder is calculated, under an engine steady-state driving condition, a weight mean value $BGIMEP_i$ for each engine cylinder of the integral value $IMEP_i$ and a weight mean value TBGIMP for all cylinders are calculated, respectively, and a deviation JGIMEP between $BGIMEP_i$ and TBGIMP is calculated. If JGIMEP$\geq$SLSNS (threshold value), the self-diagnose apparatus and method determine that any one of the inner cylinder pressure responsive sensors which corresponds to one of the cylinders which indicates the result of JGIMEP$\geq$ SLSNS has failed.

11 Claims, 3 Drawing Sheets

SELF-DIAGNOSING APPARATUS AND METHOD FOR DETERMINING OCCURENCE OF FAILURE IN INNER CYLINDER PRESSURE RESPONSIVE SENSOR APPLICABLE TO ENGINE COMBUSTION DETECTING/CONTROLLING SYSTEM

BACKGROUND OF THE INVENTION

1. Field of the Invention

The present invention relates to a self-diagnosing apparatus and method for determining occurrence of any mode of failure in any one or individual of inner cylinder pressure responsive sensors applicable to an engine combustion state detecting/controlling system.

2. Description of the Background Art

A Japanese Patent Application First Publication No. Showa 62-26345 published on Feb. 4, 1987 exemplifies a previously proposed engine combustion state (misfire) detecting system in which a plurality of inner cylinder pressure responsive sensors are disposed on respective engine cylinders and the individual engine cylinder combustion states are detected on the basis of results of detections by the respective inner cylinder pressure responsive sensors.

SUMMARY OF THE INVENTION

It is an object of the present invention to provide a self-diagnostic apparatus and method for determining whether a failure in any one of inner cylinder pressure responsive sensors in such mode of failures as broken line (breakage) of any one of the inner cylinder pressure responsive sensors, a short-circuiting in any one of the inner cylinder pressure responsive sensors, and a variation of any one of output signal levels of the inner cylinder pressure responsive sensors occurs with a simpler self-diagnosing technique and with a high accuracy of failure determination.

The above-described object can be achieved by providing a self-diagnosing apparatus for determining whether a failure in any one of inner cylinder pressure responsive sensors occurs, said inner cylinder pressure responsive sensors being disposed on respective engine cylinders so as to detect pressures within the respective engine cylinders for the respective engine cylinders and output inner cylinder pressure responsive signals indicative thereof, said diagnostic apparatus comprising: a) means for integrating one of said inner cylinder pressure responsive signals which corresponds to one of said engine cylinders for a predetermined integral interval, said integrating means integrating any other of said inner cylinder pressure responsive signals for each predetermined integral interval which corresponds to any other of the engine cylinders so as to derive the individual integrated values for all of the engine cylinders; b) means for calculating a first average value on the basis of at least presently and previously derived integrated values for every one of the engine cylinders; c) means for calculating a second average value on the basis of the presently derived integrated value for any one of the engine cylinders and previously derived second average value for all of the engine cylinders; d) means for establishing a predetermined relationship for each corresponding one of the engine cylinders between the first average value derived for the corresponding one of the engine cylinders and the second average value derived for all of the engine cylinders and comparing the established predetermined relationship with a predetermined threshold value; e) means for determining an occurrence of failure in any one of the inner cylinder pressure responsive sensors which corresponds to the corresponding one or the engine cylinders for which the compared first average value is derived when the established predetermined relationship is equal to or larger than the predetermined threshold value; and f) means for outputting a warning signal when said determining means determines the occurrence of failure in any one of the inner cylinder pressure sensors.

The above-described object can also be achieved by providing a self-diagnosing apparatus for determining whether a failure in any one of inner cylinder pressure responsive sensors occurs, said inner cylinder pressure responsive sensors being disposed on respective engine cylinders so as to detect pressures within the respective engine cylinders for the respective engine cylinders and output inner cylinder pressure responsive signals indicative thereof, said diagnostic apparatus comprising: a) means for integrating one of said inner cylinder pressure responsive signals which corresponds to one of said engine cylinders for a predetermined integral interval, said integrating means integrating any other of said inner cylinder pressure responsive signals for each predetermined integral interval which corresponds to any other of the engine cylinders so as to derive the individual integrated values for all of the engine cylinders; b) means for calculating a first average value on the basis of at least presently and previously derived integrated values for every one of the engine cylinders; c) means for calculating a second average value on the basis of the presently derived integrated value for any one of the engine cylinders and previously derived second average value for all of the engine cylinders; d) means for establishing a predetermined relationship for each corresponding one of the engine cylinders between the first average value derived for the corresponding one of the engine cylinders and the second average value derived for all of the engine cylinders and comparing the established predetermined relationship with a predetermined threshold value; and e) means for determining an occurrence of failure in any one of the inner cylinder pressure responsive sensors which corresponds to the corresponding one of the engine cylinders for which the compared first average value is derived when the established predetermined relationship is equal to or larger than the predetermined threshold value.

The above-described object can also be achieved by providing a self-diagnosing method for determining whether a failure in any one of inner cylinder pressure responsive sensors occurs, said inner cylinder pressure responsive sensors being disposed on respective engine cylinders so as to detect pressures within the respective engine cylinders for the respective engine cylinders and output inner cylinder pressure responsive signals indicative thereof, comprising the steps of: a) integrating one of said inner cylinder pressure responsive signals which corresponds to one of said engine cylinders for a predetermined integral interval, at said step a) any other of said inner cylinder pressure responsive signals being integrated for each predetermined integral interval and being corresponding to any other of the engine cylinders so as to derive the individual integrated values for all of the engine cylinders; b) calculating a first average value on the basis of at least presently and previously derived integrated values for every one of the engine cylinders; c) calculating a second average value on the basis of the presently derived integrated value for any one of the engine cylinders and previously derived second average value for all of the engine cylinders; d) establishing a predetermined relationship for each corresponding one of the engine cylinders between the first average value derived for the corresponding one of the engine cylinders and the second average value derived for all of the engine cylinders and comparing the established predetermined relationship with a predetermined threshold value; e) determining an occurrence of failure in any one of the inner cylinder pressure responsive sensors which corresponds to the corresponding one of the engine cylinders for which the compared first average value is derived when the established predetermined relationship is equal to or larger than the predetermined threshold value; and f) outputting a warning signal when at said determining step e) the occurrence of failure in any one of the inner cylinder pressure sensors is determined.

BEST MODE FOR CARRYING OUT THE INVENTION

Reference will hereinafter be made to the drawings in order to facilitate a better understanding of the present invention.

Before explaining the present invention, a problem to be solved by the present invention will be described below.

It is appreciated that when any one or each of the respective inner cylinder pressure responsive sensors cannot achieve desired inner cylinder pressure detection function any more, an erroneous detection of the engine combustion state would be brought out.

It is demanded that a diagnostic apparatus which is capable of detecting whether any one or each of the inner cylinders pressure responsive sensors normally detects the inner cylinder pressure of the corresponding one of the respective engine cylinders. For example, in order to detect a broken line of a signal output system from the inner cylinder pressure responsive sensors, it is difficult to add a hardware element such as a resistor used to detect the broken line onto the individual sensor itself since each inner cylinder pressure responsive sensor is attached onto a corresponding one of ignition plugs as a washer.

In addition, although the determination of the occurrence of failure in any one of the inner cylinder pressure responsive sensors on the basis of the failure mode of broken line is carried out, the other mode of failure includes an output signal level variation. Therefore, it is demanded that such a diagnostic apparatus and method as being capable of detecting the failure occurrence in any one of the inner cylinder pressure responsive sensors due to the different mode of failure including the output signal level variation.

Figure 1:
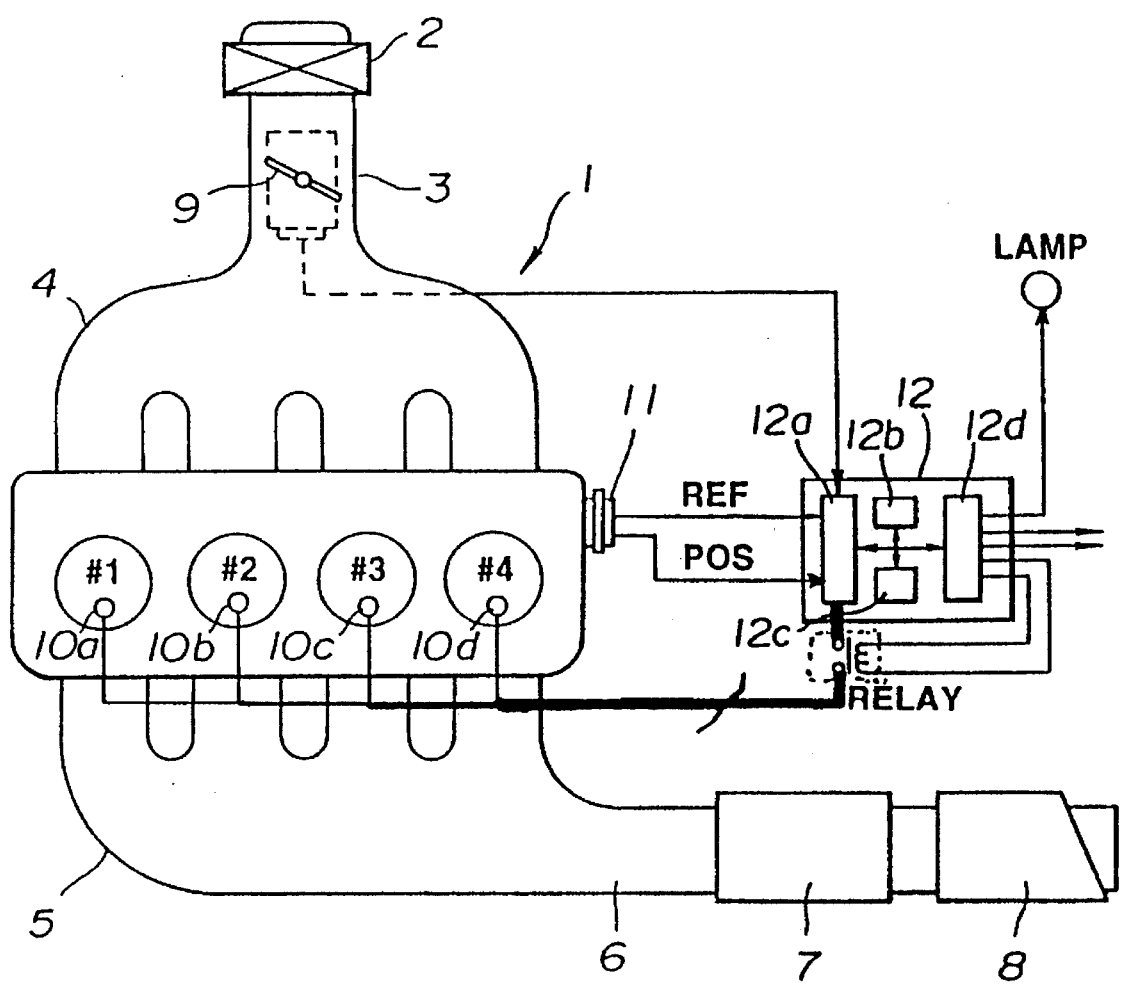
FIG. 1 is a schematic block diagram of a self-diagnosing apparatus for detecting an occurrence of failure in any one of a plurality of inner cylinder pressure responsive sensors disposed on respective engine cylinders in a preferred embodiment according to the present invention.

Next, FIG. 1 shows a preferred embodiment of a self-diagnosing apparatus for determining an occurrence of failure in any one of inner cylinder pressure responsive sensors.

As shown in FIG. 1, an internal combustion engine 1 is a straight (in-line) four-cylinder, four-stroke engine and includes an air cleaner 2, a throttle chamber 3, and an intake manifold 4, as an intake air system. An exhausted air of the engine i is exhausted to the air through an exhaust manifold 5, an exhaust duct 6, a three-element catalytic converter 7, and a muffler 8.

The throttle chamber 3 is provided with a throttle valve 9 which opens or closes the throttle chamber in an interlocking operation with an accelerator pedal (not shown) so as to adjust intake air quantity to the internal engine 1.

In addition, ignition plugs (not shown) are exposed to respective combustion chambers of the respective cylinder is (#1 through #4) so as to ignite the air-fuel mixture supplied into the corresponding one of the combustion chambers and a plurality of inner cylinder pressure responsive sensors 10a through 10d are disposed together with the respective ignition plugs for the respective engine cylinders.

The inner cylinder pressure responsive sensors 10a through 10d are the washer types (piezoelectric type sensors) of the ignition plug mounted bolt portions as disclosed in a Japanese Utility Model Registration First Publication No. Showa 63-17432 published on Feb. 5, 1988 (or disclosed: in a U.S. Pat. No. 4, 660,535, (the disclosure of which being herein incorporated by reference)).

However, those of the inner cylinder pressure responsive sensors 10a through 10d may be other types whose sensor portions (piezoelectric elements) are directly exposed to the respective combustion chambers so as to detect the inner cylinder pressures as absolute pressures as disclosed in a Japanese Patent Application First Publication No. Heisei 4-81557 published on Mar. 18, 1992.

Although FIG. 1 shows the state of a series connection of the respective inner cylinders 10a through 10d to the interface 12a via a relay, wires from the respective inner cylinder responsive sensors 10a through 10d to the interface circuit 12c are connected to the control unit 10 in parallel to each other since a multiplexer is provided in the interface circuit 12a. The connection of the respective inner cylinder pressure responsive sensors 10a through 10d to the control unit 12 is exemplified by the U.S. Pat. No. 4,660,535, (the disclosure of which is herein incorporated by reference).

It is noted that a crank angle sensor 11 is installed on a cam shaft (not shown ) of the engine 1.

The crank angle sensor 11 serves to output a reference crank angle signal REF for each 180 degree of a crankshaft rotation corresponding to a stroke phase difference between each engine cylinder (in the case of the four-cylinder engine) and to output a unit angle signal POS (for example, 1.) for each unit of the crank angle.

Figure 3:
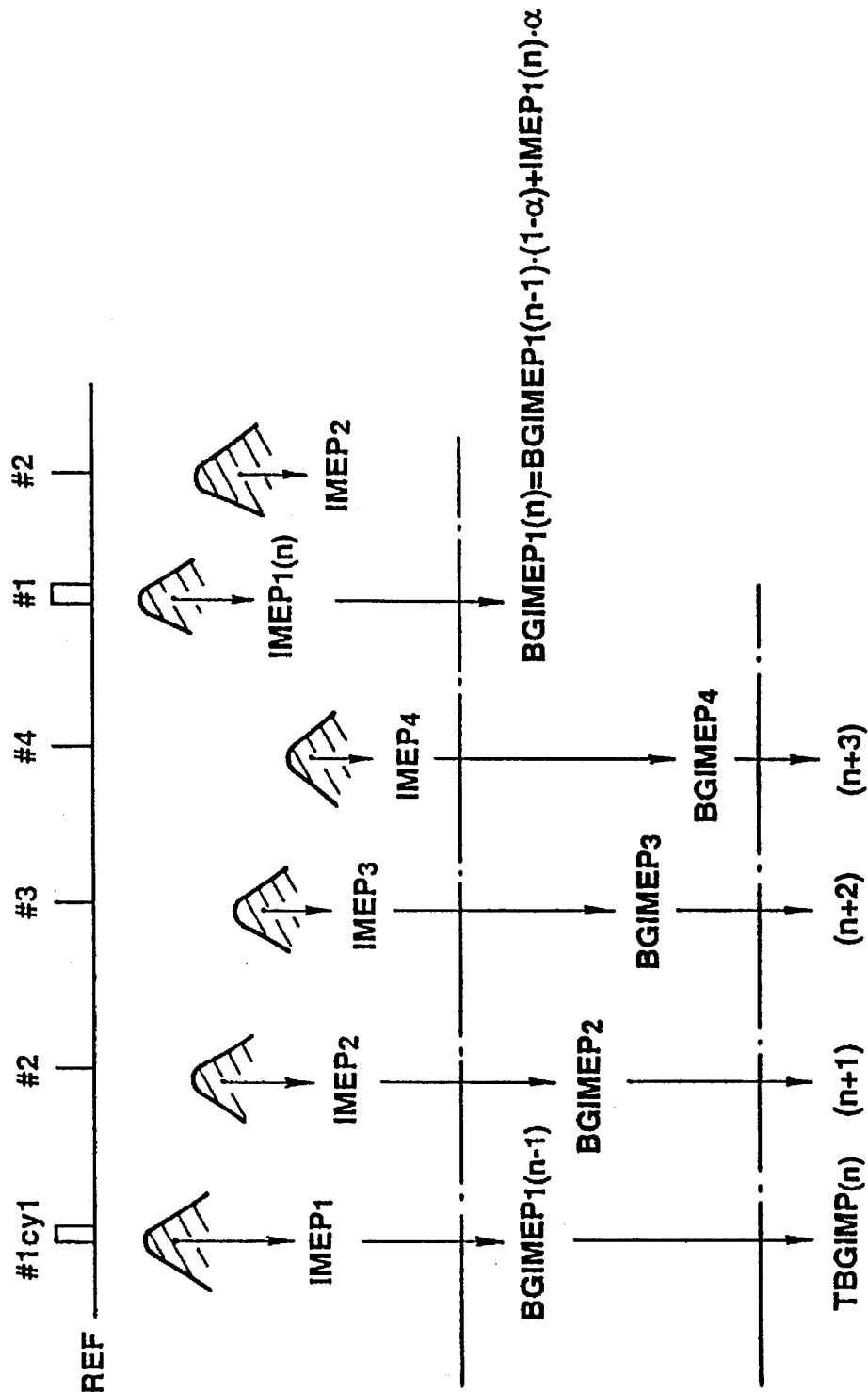
FIG. 3 is a signal timing chart representing a step of integration, weight averaging, and another weight averaging shown in FIG. 2.

As shown in FIG. 3, the reference crank angle signal REF has a different pulsewidth for a particular engine cylinder so as to discriminate (determine) which one of the engine cylinders is, for example, in a combustion stroke. In FIG. 3, the pulsewidth for a first engine cylinder;(#1) in the reference crank angle signal REF is wider than those for the other engine cylinders.

Furthermore, a throttle sensor 18 is installed on the throttle valve 9 so as to detect an opening angle TV0 of the throttle valve 9 and the throttle sensor 13 is a potentiometer type sensor.

Output signals of the inner pressure responsive sensors 10a through 10d, the crank angle sensor 11, and throttle sensor 13 are supplied to a control unit 12 installed as an engine operation control unit. The control unit 12 generally includes a microcomputer, i.e., CPU 12b, a memory GRAM and ROM) 12c, a common bus, and I/O interfaces 12a, and 12d and its peripheral circuit.

The control unit 12 serves to control a fuel injection quantity through a fuel injection valve(s) (not shown), control an ignition timing through the ignition plugs, and determine an occurrence of knocking (or misfire) in any one or each of the engine cylinders according to the output sensor signals of the respective inner cylinder pressure responsive sensors 10a through 10d.

Figure 2:
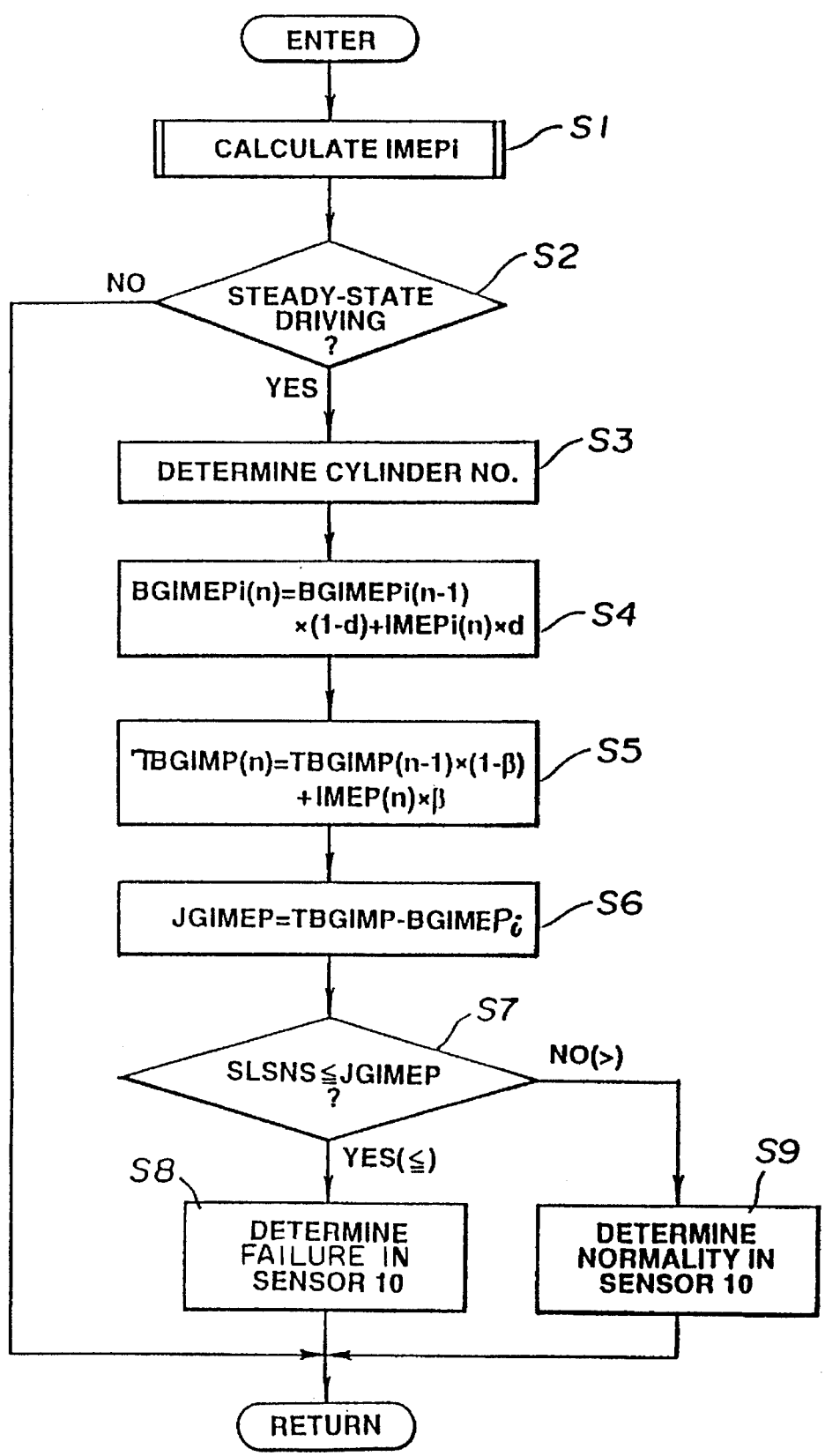
FIG. 2 is an operational flowchart of a self-diagnosing routine executed by a control unit shown in FIG. 1.

Then, the control unit 12 executes a self-diagnosing routine for the respective inner cylinder pressure responsive sensors 10a through 10d shown in FIG. 2.

FIG. 2 shows an operational flowchart representing the self-diagnosing routine.

At a step S1, the CPU 12a reads the inner cylinder pressure responsive signal P for each engine cylinder detected and output from the corresponding one of the inner cylinder pressure responsive sensors 10a through 10d and calculates a definite integral (an integration) the read inner cylinder pressure responsive signal P for a predetermined integral interval. The result of the definite integral is set as $IMEP_i$ (i denotes the cylinder number, and, in the case of FIG. 1, i=#1 through #4).

It is noted that the above-described predetermined integral interval is set as an interval from BTDC (Before Top Dead Center) 50° through ATDC (After Top Dead Center) 50°, the top dead center being at a compression stroke. However, the integral interval is not limited to the interval set as described above. In addition, in a case where the inner cylinder pressure is integrated to detect a misfire in a corresponding one of the engine cylinders, the result of the integral $IMEP_i$ may directly be applied to the system for the detection of the misfire.

At a step S2, the CPU 12b determines whether the engine 1 is in a steady-state driving condition depending on whether an engine revolution speed Ne calculated on the basis of the crank angle signals derived from the crank angle sensor 11 is constant or whether the opening angle value TV0 detected by the throttle sensor 13 is constant.

If the CPU 12b determines that the engine i is in a transient driving condition (No) at the step S2, the above-described integral value $IMEP_i$ is varied according to the determined transient driving condition so that an accuracy of self-diagnosis as will be described later is worsened. Therefore, the routine goes to a step S3 to execute the self-diagnosis for the respective inner cylinder pressure responsive sensors 10a through 10d only when the engine 1 falls in the steady-state driving condition.

That is to say, at the step S3, the CPU 12b determines the cylinder number i for which the latest integral value $IMEP_i$ is calculated.

At the next step S4, the CPU 12b calculates a weight mean (weight average) value $BGIMEP_i$ of the integral value $IMEP_i$ for the corresponding one of the cylinders using a first weight coefficient α using the following formula (1) (refer to FIG. 3).

$$BGIMEP_i = BGIMEP_i(n-1).(1-\alpha) + IMEP_i(n).\alpha \qquad (1)$$

It is noted that in the equation (1), a subscript (n−1) denotes a previous value derived before (n), n denotes the present value derived (refer to FIG. 3.

Next, at a step S5, the CPU 12b calculates another weight mean (weight average) value TBGIMP of the integrated values $IMEP_i$ for all cylinders whenever the integrated value $IMEP_i$ is calculated using the other weight coefficient β (refer to FIG. 3) using the following formula (2).

$$TBGIMP_{(n)} = TBGIMP_{(n-1)}.(1-\beta) + IMEP(n).\beta \qquad (2).$$

At a step S6, the CPU 12b calculates a deviation JGIMEP (=TBGIMP−$BGIMEP_i$) between the average value TBGIMP of the integral value $IMEP_i$ for all cylinders calculated as in the equation (2) and the average value of the integral value $IMEP_i$ presently calculated for any corresponding one of the cylinders.

At a step S7, the CPU 12b compares the deviation JGIMEP and a predetermined threshold value SLSNS which has an appropriate value to determine the occurrence in failure in any one of the inner cylinder pressure responsive sensors. If the deviation JGIMEP is equal to or larger than (yes) at the step S7, the routine goes to a step S8 in which the CPU 12b determines that any one of the inner cylinder pressure responsive sensors 10a through 10d installed on the corresponding one of the cylinders to which the $BGIMEP_i$ on the basis of which the deviation JGIMEP is derived corresponds has failed in any one of the failure modes.

It is noted that the result of determination of the occurrence of failure is informed to a driver of the vehicle on which the engine 1 and control unit 12 are mounted via a failure warning lamp (shown in FIG. 1) or so forth. In addition, upon the determination of occurrence in failure, an inhibit of the detections of the combustion states using the inner cylinder pressure responsive sensors 10a through 10d may be carried out via the relay(es) shown in FIG. 1.

On the other hand, if JGIMEP<SLSNS at the step S7, the routine goes to a step S9 in which the CPU 12b determines that any one of the inner pressure responsive sensors 10a through 10d installed on the corresponding one of the cylinders to which the $BGIMEP_i$ on the basis of which the deviation JGIMEP is derived corresponds has operated normally.

In details, it is very rare that any plural numbers of the inner cylinder pressure responsive sensors 10a through 10d have failed at once. In addition, it can be estimated that the inner cylinder pressure integrated value $IMEP_i$ for each cylinder under the engine steady-state driving condition indicates approximately equal value for each other although a more or less deviation of the integrated value occurs between each cylinder.

Then, it can be estimated that, in a case where the average value of $BGIMEP_i$ of the inner cylinder integral value for a certain cylinder has the deviation from the average value TBGIMP for all cylinders exceeding the predetermined threshold, one of the inner cylinder pressure responsive Sensors 10a through 10d cannot output a desired output value corresponding to the corresponding inner cylinder pressure due to some abnormality occurrence in the corresponding one of the inner cylinder pressure responsive sensors 10a through 10d.

Therefore, in the self-diagnosing apparatus and method in the embodiment, it is possible to diagnose the failure of the corresponding one of the inner cylinder pressure responsive sensors due to the output signal level variation in addition to the failure modes of an on and off such as the broken line or short-circuiting of the corresponding one of the inner cylinder responsive sensors. Any special hardware to advance the self-diagnossis operation is not added.

According to the present invention, since the inner cylinder pressure P is integrated for each engine cylinder, the erroneous self-diagnosis of the failure in any one of the inner cylinder pressure responsive sensors can be avoided even if a high-frequency noise component is superposed on the detection signals of the inner cylinder pressure responsive sensors.

Furthermore, since, in the embodiment, the average values take form of weight averaging method of the integrated (integral) values, it can be avoided that the accuracy of diagnosis is remarkably reduced due to a sudden occurrence of the misfire. It is noted that the above-described predetermined threshold value SLSNS may be varied according to the engine driving condition, such as an engine load.

It is also noted that, in place of the deviation JGIMEP described at the step S6, a ratio of TBGIMP to BGIMEP$_i$ may be derived. In this case, this ratio is compared with another predetermined ratio at the step S7 shown in FIG. 2.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A self-diagnosing apparatus for determining whether a failure in any one of inner cylinder pressure responsive sensors occurs, said inner cylinder pressure responsive sensors being disposed on respective engine cylinders so as to detect pressures within the respective engine cylinders for the respective engine cylinders and output inner cylinder pressure responsive signals indicative thereof, said diagnostic apparatus comprising:

a) means for integrating one of said inner cylinder pressure responsive signals which corresponds to one of said engine cylinders for a predetermined integral interval, said integrating means integrating any other of said inner cylinder pressure responsive signals for each predetermined integral interval which corresponds to any other of the engine cylinders so as to derive the individual integrated values for all of the engine cylinders;

b) means for calculating a first average value on the basis of at least presently and previously derived integrated values for every one of the engine cylinders;

c) means for calculating a second average value on the basis of the presently derived integrated value for any one of the engine cylinders and previously derived second average value for all of the engine cylinders;

d) means for establishing a predetermined relationship for each corresponding one of the engine cylinders between the first average value derived for the corresponding one of the engine cylinders and the second average value derived for all of the engine cylinders and comparing the established predetermined relationship with a predetermined threshold value;

e) means for determining an occurrence of failure in any one of the inner cylinder pressure responsive sensors which corresponds to the corresponding one of the engine cylinders for which the compared first average value is derived when the established predetermined relationship is equal to or larger than the predetermined threshold value; and f) means for outputting a warning signal when said determining means determines the occurrence of failure in any one of the inner cylinder pressure sensors.

2. A self-diagnosing apparatus for determining whether a failure in any one of inner cylinder pressure responsive sensors occurs, said inner cylinder pressure responsive sensors being disposed on respective engine cylinders so as to detect pressures within the respective engine cylinders for the respective engine cylinders and output inner cylinder pressure responsive signals indicative thereof, as claimed in claim 1, wherein said predetermined relationship is a deviation between the first and second average values.

3. A self-diagnosing apparatus for determining whether a failure in any one of inner cylinder pressure responsive sensors occurs, said inner cylinder pressure responsive sensors being disposed on respective engine cylinders so as to detect pressures within the respective engine cylinders for the respective engine cylinders and output inner cylinder pressure responsive signals indicative thereof, as claimed in claim 2, which further comprises means for determining whether the engine falls in a steady-state driving and wherein said integrating means integrates any one of the inner pressure responsive signals only when the engine falls in the steady-state driving condition.

4. A self-diagnosing apparatus for determining whether a failure in any one of inner cylinder pressure responsive sensors occurs, said inner cylinder pressure responsive sensors being disposed on respective engine cylinders so as to detect pressures within the respective engine cylinders for the respective engine cylinders and output inner cylinder pressure responsive signals indicative thereof, as claimed in claim 3, wherein each of said first and second average values is a weight mean value.

5. A self-diagnosing apparatus for determining whether a failure in any one of inner cylinder pressure responsive sensors occurs, said inner cylinder pressure responsive sensors being disposed on respective engine cylinders so as to detect pressures within the respective engine cylinders for the respective engine cylinders and output inner cylinder pressure responsive signals indicative thereof, wherein said first average value is expressed as $BGIMEP_i(n)=BGIMEP_i(n-1).(1-\alpha)+IMEP_i(n).\alpha$, wherein $IMEP_i(n)$ denotes the integrated value derived by said integrating means at the time of (n), i denotes a cylinder number, (n−1) denotes the previous value of the presently derived average value (n), and $\alpha$ denotes a first weight coefficient and wherein said second average value is expressed as $TBGIMP_{(n)}=TBGIMP_{(n-1)}.(1-\beta)+IMEP_{(n)}.\beta$, wherein $\beta$ denotes a second weight coefficient.

6. A self-diagnosing apparatus for determining whether a failure in any one of inner cylinder pressure responsive sensors occurs, said inner cylinder pressure responsive sensors being disposed on respective engine cylinders so as to detect pressures within the respective engine cylinders for the respective engine cylinders and output inner cylinder pressure responsive signals indicative thereof, as claimed in claim 5, wherein said warning means includes a warning lamp which is lighted on when receiving the warning signal.

7. A self-diagnosing apparatus for determining whether a failure in any one of inner cylinder pressure responsive sensors occurs, said inner cylinder pressure responsive sensors being disposed on respective engine cylinders so as to detect pressures within the respective engine cylinders for the respective engine cylinders and output inner cylinder pressure responsive signals indicative thereof, as claimed in claim 6, wherein said warning means outputs the warning signal so as to interrupt the inner cylinder pressure responsive signals from the respective inner cylinder pressure responsive sensors.

8. A self-diagnosing apparatus for determining whether a failure in any one of inner cylinder pressure responsive sensors occurs, said inner cylinder pressure responsive sensors being disposed on respective engine cylinders so as to detect pressures within the respective engine cylinders for the respective engine cylinders and output inner cylinder pressure responsive signals indicative thereof, said diagnostic apparatus comprising:

a) means for integrating one of said inner cylinder pressure responsive signals which corresponds to one of said engine cylinders for a predetermined integral interval, said integrating means integrating any other of said inner cylinder pressure responsive signals for each predetermined integral interval which corresponds to any other of the engine cylinders so as to derive the individual integrated values for all of the engine cylinders;

b) means for calculating a first average value on the basis of at least presently and previously derived integrated values for every one of the engine cylinders;

c) means for calculating a second average value on the basis of the presently derived integrated value for any one-of the engine cylinders and previously derived second average value for all of the engine cylinders;

d) means for establishing a predetermined relationship for each corresponding one of the engine cylinders between the first average value derived for the corresponding one of the engine cylinders and the second average value derived for all of the engine cylinders and comparing the established predetermined relationship with a predetermined threshold value; and e) means for determining an occurrence of failure in any one of the inner cylinder pressure responsive sensors which corresponds to the corresponding one of the engine cylinders for which the compared first average value is derived when the established predetermined relationship is equal to or larger than the predetermined threshold value.

9. A self-diagnosing method for determining whether a failure in any one of inner cylinder pressure responsive sensors occurs, said inner cylinder pressure responsive sensors being disposed on respective engine cylinders so as to detect pressures within the respective engine cylinders for the respective engine cylinders and output inner cylinder pressure responsive signals indicative thereof, comprising the steps of:

a) integrating one of said inner cylinder pressure responsive signals which corresponds to one of said engine cylinders for a predetermined integral interval, at said step a) any other of said inner cylinder pressure responsive signals being integrated for each predetermined integral interval and being corresponding to any other of the engine cylinders so as to derive the individual integrated values for all of the engine cylinders;

b) calculating a first average value on the basis of at least presently and previously derived integrated values for every one of the engine cylinders;

c) calculating a second average value on the basis of the presently derived integrated value for any one of the engine cylinders and previously derived second average value for all of the engine cylinders;

d) establishing a predetermined relationship for each corresponding one of the engine cylinders between the first average value derived for the corresponding one of the engine cylinders and the second average value derived for all of the engine cylinders and comparing the established predetermined relationship with a predetermined threshold value;

e) determining an occurrence of failure in any one of the inner cylinder pressure responsive sensors which corresponds to the corresponding one of the engine cylinders for which the compared first average value is derived when the established predetermined relationship is equal to or larger than the predetermined threshold value; and f) outputting a warning signal when at said determining step e) the occurrence of failure in any one of the inner cylinder pressure sensors is determined.

10. A self-diagnosing method for determining whether a failure in any one of inner cylinder pressure responsive sensors occurs, said inner cylinder pressure responsive sensors being disposed on respective engine cylinders so as to detect pressures within the respective engine cylinders for the respective engine cylinders and output inner cylinder pressure responsive signals indicative thereof, as claimed in claim 9, wherein said predetermined relationship is a deviation between the first and second average values and wherein when at said step e) the deviation is less than the predetermined threshold value, a normal operation of the corresponding one of the engine cylinders is determined.

11. A self-diagnosing method for determining whether a failure in any one of inner cylinder pressure responsive sensors occurs, said inner cylinder pressure responsive sensors being disposed on respective engine cylinders so as to detect pressures within the respective engine cylinders for the respective engine cylinders and output inner cylinder pressure responsive signals indicative thereof, as claimed in claim 9, wherein said predetermined threshold value is varied according to an engine driving condition.

\* \* \* \* \*